May 14, 1935.  C. W. VOGT  2,001,475
PACKAGING AND HANDLING FROZEN COMESTIBLES OR THE LIKE
Filed Jan. 9, 1932  4 Sheets-Sheet 1
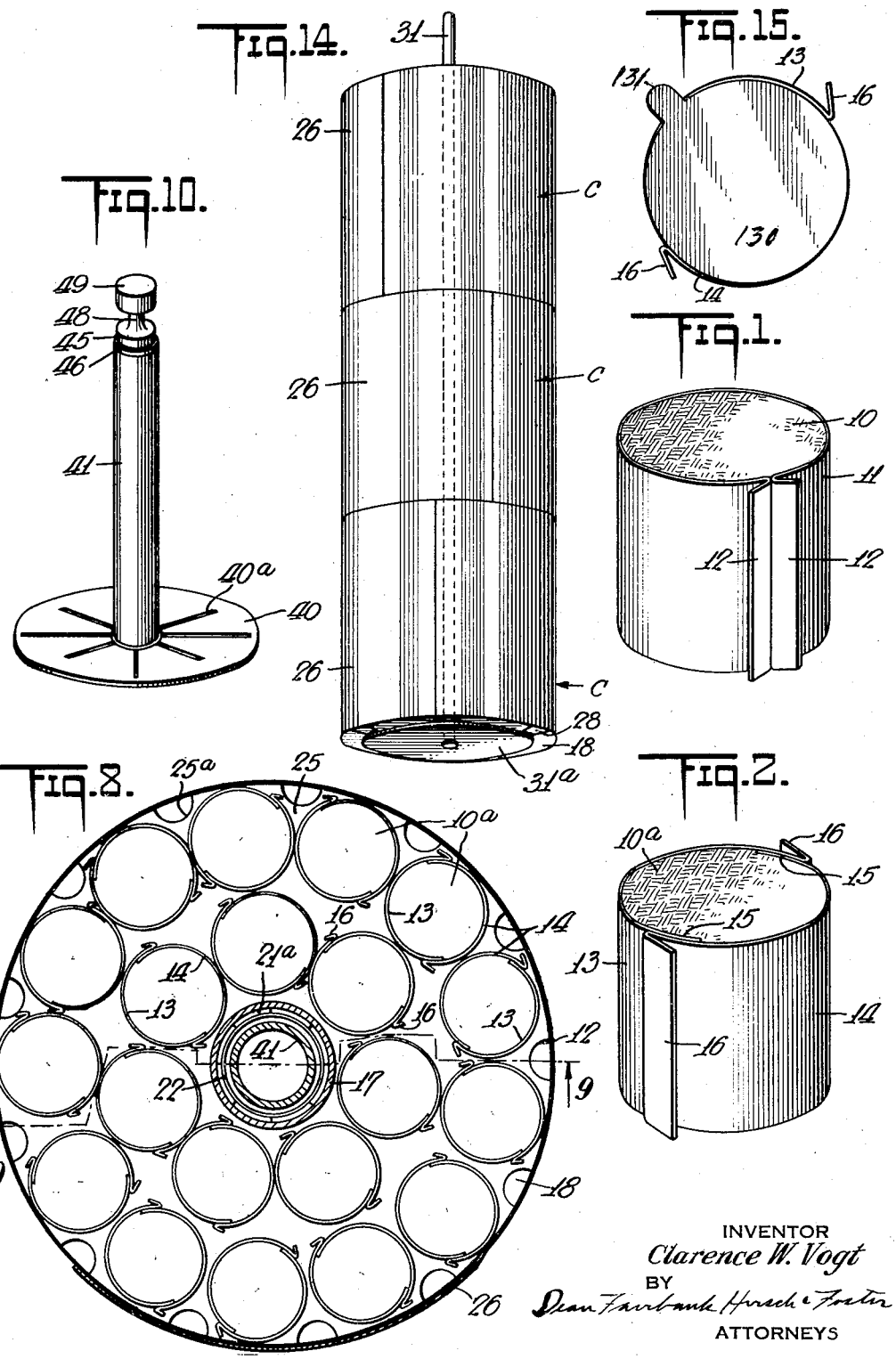

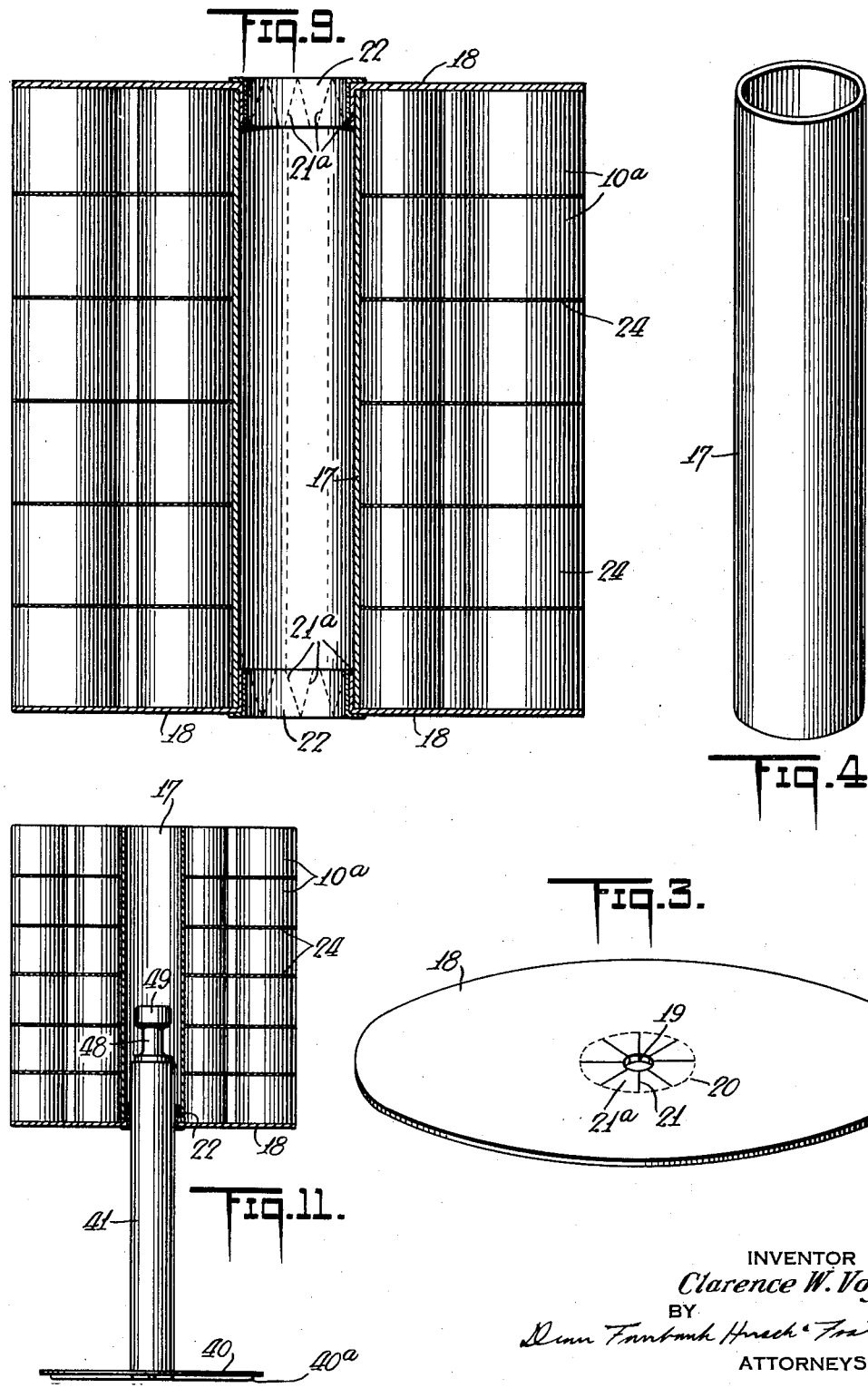

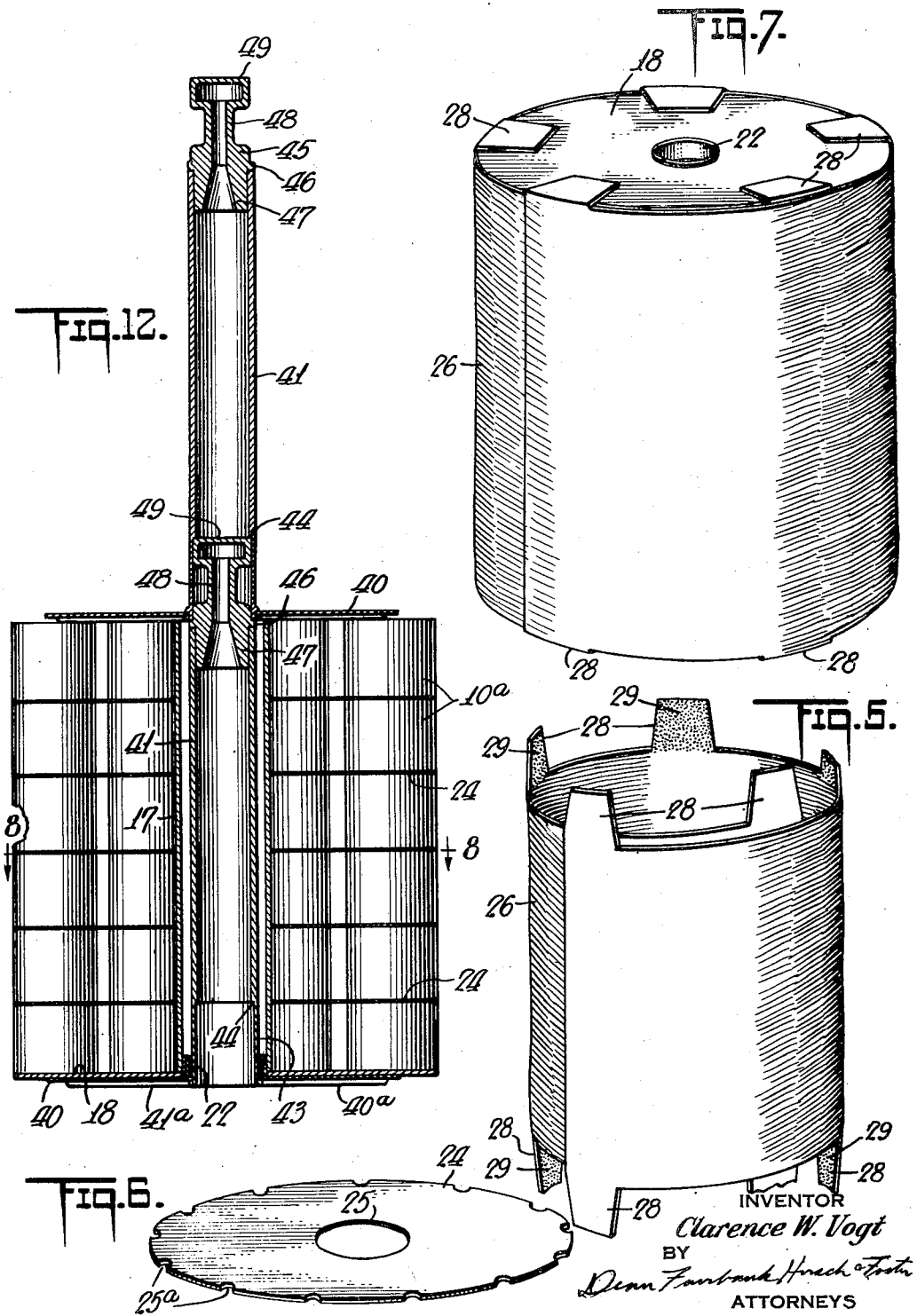

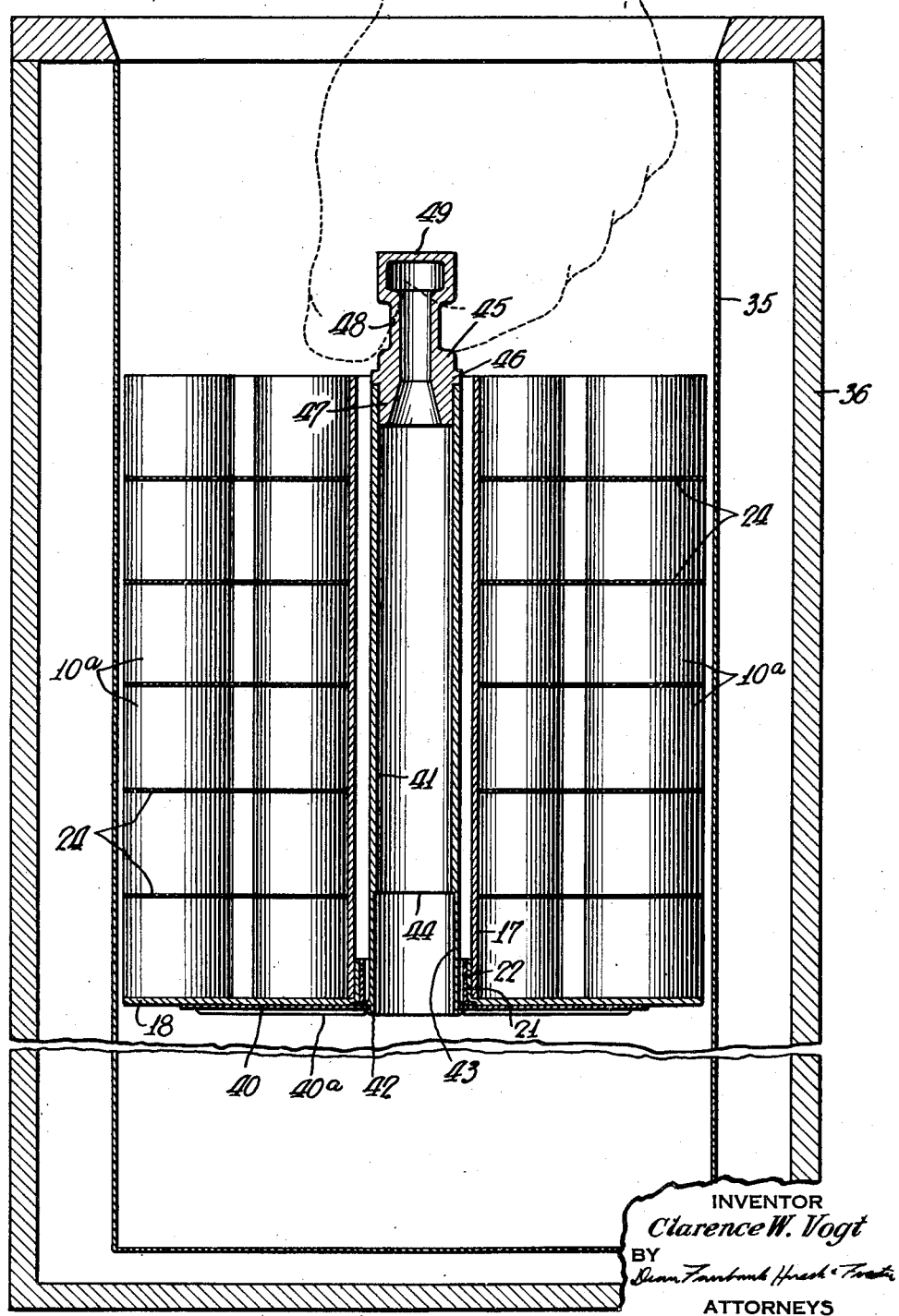

Patented May 14, 1935

2,001,475

UNITED STATES PATENT OFFICE 2,001,475

PACKAGING AND HANDLING FROZEN COMESTIBLES OR THE LIKE

Clarence W. Vogt, Louisville, Ky., assignor, by mesne assignments, to Vogt Processes, Incorporated, Louisville, Ky., a corporation of Delaware Application January 9, 1932, Serial No. 585,745

1 Claim. (Cl. 206—46)

While my present invention is primarily concerned with the packaging, storage, transport and dispensing of ice cream or other frozen comestibles, many features of the invention are applicable in other fields, such as the handling of butter, margarin or other foodstuffs not solid at body temperatures.

An object of the invention is to provide a small package of ice cream of sufficient size to be served as an individual portion at a dispensary, and of such form that it lends itself readily to hardening before or after its complete dimensioning or after its formation or severance, and to packaging in bulk or multiple units or bundles for purposes of storage, transport and, eventually, convenient dispensation.

Another object is to provide an individual ice cream package which when served may be unwrapped with expedition, facility and in a sanitary manner without danger of soiling the fingers or deforming the block of ice cream while removing the wrapper, and the wrapment may be removed manually by the soda dispenser by simply peeling the wrapment from one surface or all of its surfaces.

"Peeling" as used herein is to be understood to mean the bending of the wrapment away from the material approximately at its line of contact therewith at an angle of 90° or more.

Another object of the invention is to provide an individual portion or block of ice cream which is so shaped and proportioned as to give the impression of generous size and bulk particularly when used in sundæs or sodas or ice cream cones or in individual portions of ice cream, it being well known that the dipping of bulk ice cream (containing approximately 50% by volume of air) causes a decrease in overrun of about 20 to 35%, depending upon the hardness of the cream when dipped, the sharpness of the dipper and the skill of the operator in scooping up the cream and using a minimum of facial pressure. Such reduction of volume will be referred to herein as "dipping loss", which is the usual term used in the trade. It will be apparent that if this "dipping loss" can be avoided, a larger sized portion can be sold by the dispenser inasmuch as he now purchases ice cream on a volume basis.

Another object of the invention is to provide a shipping package in which a quantity of the small packages may be conveniently assembled, stored and transported, such package being characterized by convenience in handling, compactness in size and facility of removal of the individual packages from the bulk or multiple container for dispensing purposes.

Another object is to provide a shipping container combining economy of construction cost and ease of assembly with maximum ruggedness and durability in use to the end that a relatively cheap package (capable of assembly by simple manual operation and without the use of tools) will effectively protect its contents against noticeable or objectionable deformation during the vicissitudes of careless handling.

Another object is to provide a shipping container which (before or after opening or partial destruction to expose the ice cream) may be readily mounted upon a simple lifting structure within the can or hole of a standard ice cream cabinet so that the individual ice cream packages may be conveniently elevated above the middle of the cabinet even though the cabinet contains less than one-half its total capacity of packages.

Another object is to provide a rugged, durable, practical hand elevator or carrier for bulk packages of individual ice cream blocks designed to facilitate the lifting of the package containers to the top of the hole so that they may be readily grasped and removed. This elevator is designed to permit the convenient storage of a maximum number of packages in a hole with the partially empty container always uppermost and the empty or a completely full reserve container or holder always lowermost and so arranged that the lifting of one container of individual ice cream blocks may be accomplished without disturbing other similar subjacent packages so that a minimum of manual effort is required by the ice cream dispenser, the arrangement eliminating as far as possible the need for bending over to reach packages in the bottom of the can and the need for lifting an unduly great weight of ice cream in order to get at a single package.

Other advantages of the invention will be pointed out hereafter or will be self-evident from the appended detailed description or the accompanying drawings.

As above suggested the individual blocks of ice cream may be formed in various shapes but for reasons which more fully hereinafter appear I prefer that these blocks shall be of cylindrical shape with a height or length approximating their diameter.

A feature of the invention is the use of a wrapper about the blocks of ice cream which affords in the finished product a pair of outwardly extending dry, accessible tabs. By a simple manual pull upon these tabs, the wrapper is immediately disengaged from the product without the hands of the dispenser ever coming into contact with the ice cream.

For purposes of subsequent storage, hardening, shipment and dispensing the individual packages are packed in bulk in larger containers which for the sake of descriptive convenience will be termed "shipping containers". They consist preferably of upper and lower relatively stiff discs connected centrally by a hollow core. In assembling the package, the individual packages of ice cream are placed on the lower disc (the upper surface of which may be wax or paraffin coated) about the pedestal formed by the core. The number and arrangement of packages is subject, of course, to material variation in accordance with the shape of the packages, their proposed manner of use and the requirement of the trade. After the bottom row of packages has been assembled on the bottom disc of the shipping package, a centrally apertured disc of paraffin paper or the like is dropped over the tube and a second similar series of packages placed on top of the paper disc.

After the individual packages have been stacked about the cylindrical center of the shipping package, the upper disc is applied, the lower or inner surface of this disc also being paraffin or wax coated, and a sheet of wrapping material placed around the package to provide a cylindrical protector for the sides of the individual ice cream blocks. Preferably the central tube, the end discs and the side wrapper are of fairly heavy stock and are all secured into a firm assembly by simply bending and pasting tab connections of the wrapping material to the exterior surfaces of the discs.

Of course, it will be understood that the upper and lower stiff discs need not necessarily be paraffin coated and, in such case, the additional flexible wax coated discs would be placed between the ice cream and the inwardly facing surfaces of the stiff upper and lower discs.

Another modification, which may be preferred in some cases, consists in using small circular, flexible paper discs on the top and bottom of each individual portion, in lieu of using a larger disc to cover a series of such individual portions as hereinbefore described. The advantage of using the single large disc to cover a number of packages is that somewhat less time will be consumed in the dispensing, as the one wrapper exposes the upper surface of the entire layer of say twenty portions. However, at certain times of the year and in locations where the ice cream must be held in the cabinet for four or five days, or where the individual portions may be purchased for remote consumption, the individual bottom disc or lid, preferably with a tab extending slightly beyond the edges, is desirable because the ice cream will not dry out or lose its flavor or be subject to contamination when it is held completely wrapped until the moment of consumption.

By using a package having a tubular center I not only gain strength but afford maximum convenience in subsequent transporatation and handling. To carry the packages from the hardening or cold storage room to the delivery wagon and from the delivery wagon to the retail store, it is merely necessary to stack them upon a central vertical handle having at its lower end an enlargement of greater diameter than the cylindrical core of the packages. Two, three or more packages may thus be slipped over a common carrier handle and conveniently transported to or from the delivery vehicle.

The virtue of the tubular centers of the package again becomes evident at the location of retail storage and dispensing since the ordinary cans or holes of an ice cream cabinet may be equipped with lifting tools each consisting of a shaft rising from a platform of slightly less diameter than the can. When the shipping packages reach the store the side and top of the wrapper are preferably removed and the package slipped over the shaft of the lifting tool. In an ordinary round five gallon cabinet, two shipping packages may be conveniently accommodated and the handle of one elevator telescopes to a limited extent within the hollow shaft of a similar superjacent elevator so that there is no lost space in the cabinet between the upper and lower shipping packages.

This telescoping and abutment feature of the shafts and handles of the lifting tools also permits one tool with a shipping package therein to be dropped into the hole on top of another tool and the weight of the upper package sustained by the lower tool which rests on the bottom of the cabinet, while the ice cream is supported near the top of the hole or can conveniently accessible for dispensing.

The invention may be more fully understood from the following description in connection with the accompanying drawings wherein:

Fig. 1 is a perspective view of one of the individual wrapped portions or blocks of ice cream as it comes from the cut-off mechanism.

Fig. 2 is a similar view illustrating a slightly modified form of wrapper.

Fig. 3 is a perspective view of one of the discs used in making up the shipping package.

Fig. 4 is a perspective view of the tubular center element of the shipping package.

Fig. 5 is a perspective view of the wrapper which encircles the shipping package.

Fig. 6 is a perspective view of one of the sheets of paraffin paper interposed between layers of ice cream packages within the shipping container.

Fig. 7 is a perspective view of the assembled shipping container.

Fig. 8 is a sectional plan view through the shipping container showing the arrangement of the individual packages of ice cream therein.

Fig. 9 is a vertical sectional view through the filled shipping container.

Fig. 10 is a perspective view of one of the hand operated lifting tools or elevators adapted to be employed in ice cream cans.

Fig. 11 is a side elevation of this tool showing one of the shipping packages about to be dropped into place on the tube.

Fig. 12 is a view on an enlarged scale showing one tool with a shipping package of ice cream carried thereby and with another tool telescoped over its upper end and in position to receive a second similar package.

Fig. 13 is a somewhat diagrammatic broken vertical sectional view through an ice cream cabinet showing the manner in which one shipping package and lifting tool feed within the can and illustrating the manner in which the tool may be operated to bring the ice cream to the top of the hole.

Fig. 14 is a perspective view showing the manner in which a number of shipping containers may be carried about on a handle stick, and Fig. 15 is a plan view of a closure or end wall for the individual portion shown in Fig. 1.

The term ice cream is used in the following specification and claims primarily for descriptive convenience and is intended to include all comestibles which present similar problems in packaging and handling.

In the specific form illustrated the individually packaged portion of ice cream (Fig. 1) is in the form of a cylindrical block 10 hard enough to be form sustaining and preferably about the same or of slightly greater height than diameter. This block is encircled by a wrapper 11 of waxed paper or the like, the wrapping sheet being slightly longer than the circumference of the block so that the periphery of the block may be completely covered and the two ends of the wrapper folded back on themselves to provide handle tabs 12 preferably turned in opposite directions. To release the block from its wrapper it is merely necessary to grasp the two tabs, and pull them in opposite directions.

This product is disclosed and claimed in my divisional application Serial No. 667,329, filed April 22, 1933.

The method of and apparatus for forming the ice cream blocks and of wrapping them to form the individual packages is not claimed herein. It preferably follows generally the teachings of my prior Patent No. 1,810,740.

A continuous cylindrical stream of ice cream in partially frozen or plastic condition is extruded onto or within a wrapper, the latter encircling the plastic ice cream mass in the manner illustrated in Fig. 1. The wrapper with the contained cream passes through a hardening chamber and the hardened bar is then severed into individual sections by cut-off mechanism which cuts through both the cream and the wrapper.

Cognate subject matter relating to special features of the above described method and apparatus is disclosed in copending applications Serial Nos. 628,322, filed August 11, 1932; 658,264, filed February 23, 1933; 678,624, filed July 1, 1933, and 709,245, filed February 1, 1934.

Fig. 2 illustrates an alternative form of wrapper for the individual ice cream section 10a. In this instance two sheets of wrapping papers 13 and 14 are utilized, each of them being of a length greater than a semi-circumference of the ice cream block. One end of each sheet is overlapped by the opposite end of the other sheet as indicated at 15 and the terminals of these covering ends are turned back or reversely bent to provide a pair of diametrically opposed tabs 16 facing in opposite directions. This product is disclosed and claimed in my Patent 1,906,183, issued April 25, 1933, on an application filed as a division of the present application. Preferably each individual portion has end discs or covers 130 of paper or the like of circular form and having tabs 131 by means of which they may be stripped off (see Fig. 15). To release the cream from the wrapper it is merely necessary to pull off the end covers and to grasp and pull the tabs of the peripheral wrapper whereupon both pieces of the paper are removed and the block of cream released.

I have found the cylindrically shaped block herein illustrated to be particularly advantageous for many purposes. When the ice cream is to be used in making sundaes the block will stand on its flat end, rise well above the plate and in a round bottomed dish will (since it does not conform to the depression in the dish) give the appearance of considerably greater bulk than an ordinary scoop of ice cream of corresponding weight of material.

While the diameter of the block is preferably greater than the diameter of the mouth of the ordinary ice cream cone, this block may be tilted at an angle of approximately 45° when inserted in the mouth of the cone. The major portion of the ice cream projects above the top of the cone and the consumer can appreciate the generous helping of ice cream which the cone contains.

The block will also fit endwise into a standard size soda glass and present a greater amount of ice cream above the surface of the liquid due to the elimination of the "dipping loss" hereinbefore explained. Two such blocks used in the long flat dishes in common service at soda fountains for banana splits or the like are peculiarly effective. In all conditions of use the predetermined shape of the block avoids the appearance of being dumped or scraped onto a plate and appears far more delectable than slabs or scoops of ice cream similarly used.

I have found that, when ice cream is frozen, packaged and then dispensed in the manner which I have disclosed herein, it is much more resistant to heat shock. That is, it will melt much more slowly after being removed from the cabinet and placed in a dish exposed to room temperature than is the case where ice cream is scooped out of the can and served in the ordinary manner. I attribute the principal reason for this as being that the structure of the ice cream, made and dispensed in this manner, is not appreciably altered and the air cells are sufficiently small and strong and have not been destroyed and serve to retain the structure even though the ice cream reaches and passes above the temperature at which the majority of the frozen water has been reliquefied. This difference in melting time becomes greatest where no artificial binders, such as gum or gelatin, have been used in the preparation of the mix, and is of particular importance because it is highly desirable for ice cream to be served at as warm a temperature as is possible, both because of the fact that the flavors of the ice cream are more recognizable when ice cream is softer and warmer than is the case when ice cream is placed in the mouth while still cold and hard, and also because the consumer can eat larger portions with less discomfort. Practically from the time ice cream was first dispensed in confectionery establishments, etc., there have been repeated attempts to force ice cream manufacturers to eliminate such binders, but these attempts have been only partially successful because the dealer has found that the ice cream, which he has heretofore been able to procure of a commercial overrun and butter fat content and at a competitive price, could not be handled satisfactorily or profitably without the use of some binder, unless it were maintained at a cold temperature and of a relatively hard consistency. When such ice cream has been dispensed by dipping from relatively large diameter cans (for instance, the ordinary 5 gallon can is around 9" inside diameter), the ice cream remains frozen and sticks to the sides of the can, and as long as this ice cream remains sufficiently hard, the ice cream does not sink in the can. However, as soon as ice cream has warmed up and softened, there is less adhesion between the cream and the insides of the cans and the ice cream in the center takes on the form of a crater.

In my form of individual package the ice cream in the center of the package is supported to a much greater extent by the surroundng paper as it is less than 1" away from this paper and as I prefer to use a paper of sufficient stiffness to withstand all of the superposed weight to which it is normally subjected without depending upon the stiffness of the ice cream within the package to prevent its collapse, it will be readily seen that this ice cream can be permitted to get much softer without noticeable shrinkage occurring in the center or at any place in the package.

The shipping container for carrying a number of these individual blocks or portions of ice cream includes a central tubular core 17 (Fig. 4) which may be in all respects similar to a conventional spirally wound mailing tube having rough cardboard at its inside surface and preferably being slightly glazed at its outer surface. The top and bottom of the shipping container are formed by discs 18 preferably of corrugated paper board having central portions which are suitably slotted and scored to coact and interlock with the ends of the core 17.

The surfaces of each of these discs, facing the individual portions of the container of which the discs are a part, are paraffined as heretofore explained, provided the additional flexible waxed discs are not used.

At the center of each of these discs a small circular opening 19 is provided (Fig. 3) this opening being encircled by a concentric scoring or folding line 20. A plurality of radial slits 21 extending from the fold line 20 to the central opening define tongues 21a which may be bent into the mouth of the tube 17.

A short annular ring or ferrule 22, preferably of metal, is forced into the end of the tubular core 17 and serves to fold the tongues 21a outwardly and tightly press the tongues against the inside surface of the tubular core 17, thus forming a hub construction which serves to lock the mailing tube and discs firmly together. The necessary rigidity may be accomplished by providing the tongues 21a with slightly adhesive material and moisten them before they are bent into the tube ends and pressed against the tube sides. However, the use of the ring 22 is preferred because of the assurance of additional rigidity. This may be of material other than metal, if desired.

The shipping container is built up as the ice cream is packed therein, the first step being to secure the lower end of the tube to the bottom disc 18 of the container.

If the top surface of the disc 18 is not coated with paraffin or the like, a disc 24 of paraffin paper, having a central aperture 25 therein to receive the tube 17, is slipped over the top of the tube and rests flatly on the bottom disc 18. As is shown in Fig. 6, I prefer that this disc be provided with one or more indentures 25a, which extend at their deepest portions about ⅜" from the outside edge of the circle, but at the same time these indentures should not be sufficiently deep to prevent the encompassing of the outside of the perimeter of the individual portions to be placed thereon. The purpose of these indentures will be made clear later on in these specifications.

The individual ice cream packages are then placed on the disc, the center tube being encircled by an inner ring of seven packages which are in turn encircled by an outer ring of thirteen packages, the latter ring lying normally slightly outside the confines of the disc. I have found that by closing this outer ring somewhat there is exerted a keying action between the outer and inner ring packages which makes a firmer package and prevents displacement of the packages due to the jostling of the delivery trucks, etc.

Having placed one layer of individual packages on the bottom disc 18 or on the disc 24 thereon, a second disc 24 is slipped over the top of the tube and smoothed down upon the layer of individual ice cream packages, the same being located radially so that the serrations come somewhere in between the adjacent portions of the outer ring of individual packages. A second layer of ice cream packages is then placed on top of the paraffined disc and, since the lower layer is visible through the paper, the correct positioning of the second layer is facilitated. This is not necessary, but is, of course, advisable for the sake of regularity and neatness. The layers are thus successively built up with paraffin paper discs 24 between them to a considerable height, each shipping container typically containing 5 to 6 layers of individual packages (depending upon the desired height of the portion) with twenty packages in each layer. If the container is built up with six layers of individual packages, there will be seven paraffined discs 24, counting the first or bottom disc and the top covering disc. Provided the corrugated discs 18 are paraffined on their inner surfaces, as heretofore explained, only five of these discs may be used. However, I prefer to use the extra discs 24 between the ice cream portions and discs 18 because the discs 24, due to their greater flexibility, leave less ice cream adhering to the paper, especially in cases where the cabinet has fluctuated considerably in temperature and thus has caused a softening and rehardening of the ice cream during its period of storage in the cabinet.

The principal advantage of the indentures 25a is that they provide space for the finger of the operator to be inserted so that the overlapping portions of the discs can be grasped and the discs peeled off of the upper portion of the layer which it covers.

If the individual packages contain 1/50 of a gallon each (a suitable and generous amount for soda fountain purposes), a filled shipping container made up of six layers of twenty portions per layer will contain 2.4 gallons. Provided extra large portions are desired, this same gallonage per container can be obtained by simply maintaining the same diameter of each individual portion and the same number of portions per layer, but by increasing the height of each portion approximately 20%, thus providing five layers each containing twenty individual portions or one hundred portions per package. Such individual package will be approximately 1/42 of a gallon.

The next operation is to apply the upper disc 18 to the package in the manner above described and to wrap the package with a cylindrical wrapping sheet also of relatively strong paper stock. I prefer that the wrapping sheet 26 be sufficiently long so as to provide a generous overlapping of the edges so that these ends will not need to be sealed together. With this construction the subsequent removal of the wrapping sheet 26 is expedited as the hand can be inserted between the overlapped portions and this wrapping sheet removed from around the package without the use of any tools or scissors or cutters. By providing each of the overlapping ends with upper and lower tab portions, the outer portion of the lap is held snugly against the inner portion. Both the top and bottom of the sheet 26 are provided with any suitable number of projecting tabs 28 also having adhesive material 29 on their inner faces. These tabs are folded over and glued to the outer faces of the respective discs 18. It is primarily the use of these glued tabs which renders gluing of the core to the discs unnecessary since the core even if not glued to the discs will be held in proper position in the final assembly of the shipping package.

The method of handling these shipping containers between the time that they are filled and the time that they are placed on the delivery wagon is not claimed herein but for a better understanding of one advantage of the package it may be briefly noted that the packages are preferably placed on inclined rails at the entry end of a cold storage room and roll by gravity to their point of exit from which they may be removed as needed by the drivers of the delivery trucks. The packages are sufficiently strong and of correct shape to withstand this rolling action and to bump against each other without danger of becoming deformed or of deforming their contents.

When the containers are carried from the point of storage to the truck, the truckman may use a stick 31 (Fig. 14) having a plate 31a secured to its lower end. The shipping containers indicated generally at C are slipped one after another over the stick 31 and the projecting upper end of the stick is then grasped and serves as a handle for carrying any suitable number of containers to the truck or from the truck to the retail store. I have illustratively shown a handle of sufficient length so that three shipping containers may be telescoped over it, this representing a total weight which may be conveniently carried by the truckman. The trucks may be provided with metal cells or tubes placed either vertically or horizontally, depending on the particular truck construction, such tubes or cells being adapted to receive one or more of the shipping containers.

During the operation of stacking individual ice cream packages in a shipping container, the hollow core 17 affords a convenient center post about which the inner ring of packages may be conveniently arranged. During all stages of use and handling of the container, this tube acts as a substantial reinforcement. It permits any desired number of the packages to be conveniently carried on the stick as shown in Fig. 14 and as will now appear, serves the further purpose of accommodating the vertical shaft of a hand elevating tool when the partially disassembled containers are placed in the can or hole 35 of a standard ice cream dispensing cabinet 36 (Fig. 13).

Each lifting tool (Figs. 10, 12 and 13) includes a circular bottom plate 40 which may be radially ribbed as at 40a to strengthen it and which is secured to the lower end of a hollow shaft 41, the latter extending through a suitable opening in the center of the plate 40 and being spun or swaged over the plate as indicated at 42. The internal diameter of the shaft 41 is slightly enlarged as at 43 near the lower end of the latter, defining a downwardly facing annular shoulder 44, the purpose of which will more fully hereinafter appear.

A handle member 45 is fitted into the upper end of the shaft or tube 41, this handle member being preferably of hollow construction to minimize weight and including an external flange 46 to abut the top of the shaft 41. One end 47 of this handle extends into the tube to which it is soldered or welded or otherwise rigidly attached and the projecting handle end includes a neck portion 48 and a handle knob 49.

The external diameter of the knob 49 corresponds to the internal diameter of the enlarged lower end 43 of the shaft so that when two of the elevators are placed one upon the other as indicated in Fig. 12 the handle knob 49 of one will lie within the lower end of the shaft of the other and abut the shoulder 44. Correspondingly the total length of the handle between the flange 46 and the top of the knob 49 corresponds to the total length of the enlarged shaft section 43 so that the bottom of one shaft 41 may at the same time abut the flange 46 of a subjacent similar tool.

When the shipping containers arrive at the retail store they are preferably slipped over the shaft 41 of a lifting tool or elevator and after removing the outer wrapper 26 and the top disc 18 the tool is lowered into the can 35. Subsequently a similar tool bearing a second package may be lowered in after it with the two lifting tools telescoped as illustrated in Fig. 12.

Inasmuch as the conventional hole of an ice cream dispensing cabinet is adapted to receive, with some clearance, a five gallon can of ice cream, the present invention permits the can to be eliminated and approximately five gallons of ice cream in two groups of approximately two and one-half gallons each conveniently dropped into the hole without binding.

The reason that approximately the same gallonage can be gotten into the space provided in the present cabinets for the reception of the bulk ice cream in five gallon cans, is that a good deal of lost space now exists around the can in order that the lifting tools can be inserted over the bead which extends around the outside of the upper portion of the can and the can withdrawn through the top of the cabinet while the lifting tool is in place. By using a system of packaging involving a central supporting core, this present excess space around the can is more fully utilized than would be the case if the central core were dispensed with and the shipping containers had permanent outer edges in place of the outer wrapping paper.

Another advantage, which is not quite so obvious, is that with my construction the individual portions are more directly subjected to the refrigerating effect of the interior casing or lining of the cabinet, hole or can of the cabinet. With the present type of can, when a dispenser reaches into the can with a warm dipping tool and scoops out a portion of ice cream, the air in the can is greatly warmed up from the heat of the scoop and the heat radiating from the dispenser's hand, arm and clothing. This heat must be dissipated through the cream adhering to the walls of the can, then through the can, then into the refrigerated space surrounding the can. By the elimination of the outer jacket, the hot air, or the heating which occurs when the hand is inserted into the cabinet for the removal of a portion, immediately equalizes with the cold air in the jacketed space and is not trapped in the can. This, together with the many other features of the invention which have been heretofore explained, permits of carrying brine, or other refrigerant used in the cabinet, at a somewhat higher temperature and therefore permits of an appreciable saving in refrigeration.

While it has heretofore been proposed to make individual packaged portions for dispensing at the soda fountains, such proposals contemplated pouring or spreading partly frozen ice cream into pre-formed paper cells. Such proposal has never been adopted commercially because of the impairment of quality caused by such spreading and because of the difficulty of completely and perfectly filling such pre-formed cells without underfilling or over-filling above the edges of the cells and the leakage of the ice cream over the edges of the cells onto the outside edges with consequent sticking together of the cells during the subsequent hardening necessary with such heretofore proposed procedure. Obviously, such procedure does not admit of perfect edging (the material in the containers being exactly even with the edge) as is practically assured by my method of filling a substantially long tube or conduit and cutting the filled tube (wrapment and contained material) in a simultaneous operation as disclosed in my previous mentioned patents and copending applications.

After the ice cream carried by the upper lifting tool has been completely dispensed, the position of the two lifting tools may be reversed bringing the filled tool to the top of the can and obviating the need for the attendant at the dispensing cabinet bending over and reaching way down into the bottom of the can to extract the remaining ice cream therein. In fact in every instance the handle knob of the uppermost lifting tool is disposed approximately at the level of the inside top of the hole for convenience in maintaining the cream in a position where a package may be extracted.

The circular shape of the individual ice cream packages materially facilitates the removal of the first package from a layer since the operator, spanning a container with his thumb and forefinger will find finger room at both sides of the package and may conveniently lift it out.

The handling of the ice cream from start to finish is effected in a highly sanitary manner. It comes from the forming machine completely wrapped. It is placed in the shipping containers without the fingers coming in contact with the cream. It is placed in the storage cabinet at the fountain without any need for the operator touching the ice cream and it is released from its wrapper and dropped into the plate or cone by pulling on tabs 12, 12 or 16, 16 as the case may be.

It will thus be seen that there is herein described apparatus in which the several features of this invention are embodied, and which apparatus in its action attains the various objects of the invention and is well suited to meet the requirements of practical use.

As many changes could be made in the above construction, and many apparently widely different embodiments of this invention could be made without departing from the scope thereof, it is intended that all matter contained in the above description or shown in the accompanying drawings shall be interpreted as illustrative and not in a limiting sense.

The invention common to this application and my copending applications Serial Nos. 629,776 and 709,245 is broadly claimed in the last mentioned application. The invention common to this application and my copending application Serial No. 629,776 but not common to application Serial No. 709,245 is broadly claimed in copending application Serial No. 629,776.

Having thus described my invention, what I claim as new and desire to secure by Letters Patent is:—

A shipping package of ice cream or other frozen comestible, including a plurality of substantially cylindrical blocks of the frozen ice cream, each having substantially flat top and bottom end walls, wrapping material extending around the periphery of each block, a plurality of interleaves of non-absorbent sheet material disposed between successive layers and in direct contact with the top and bottom ends of the individual blocks, a casing enclosing all of said blocks and holding them in predetermined relative positions, said casing including a central tube of a diameter approximately equal to the diameter of one of said blocks and extending through the series of layers, end walls secured to the ends of said tube, and a wrapper encircling all of said blocks and having its opposite edges secured to said end walls to hold said blocks in assembled relationship between said end walls.

CLARENCE W. VOGT.